Sept. 13, 1949.   S. HILLER, JR., ET AL   2,481,750
HELICOPTER
Filed June 3, 1947   6 Sheets-Sheet 1
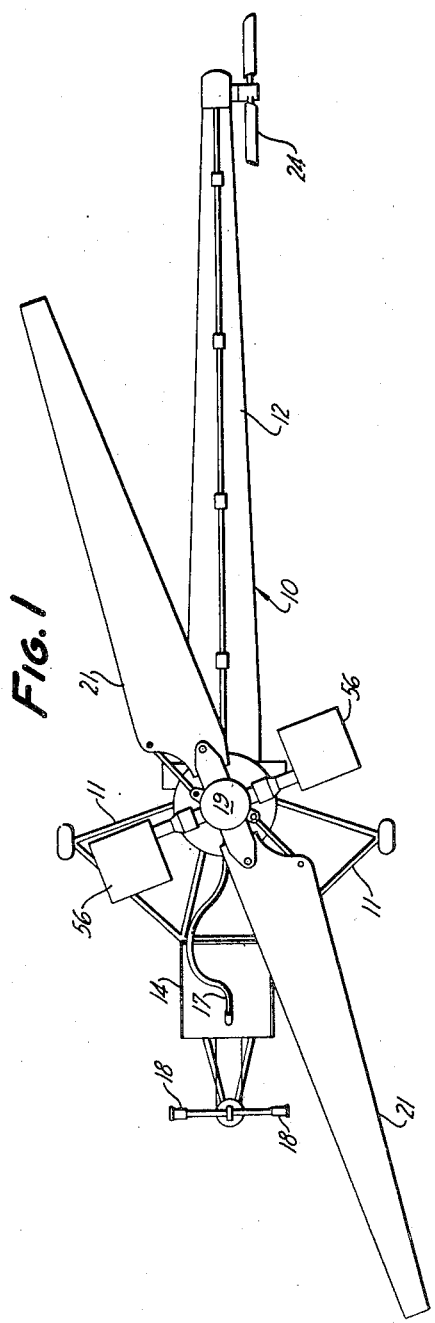
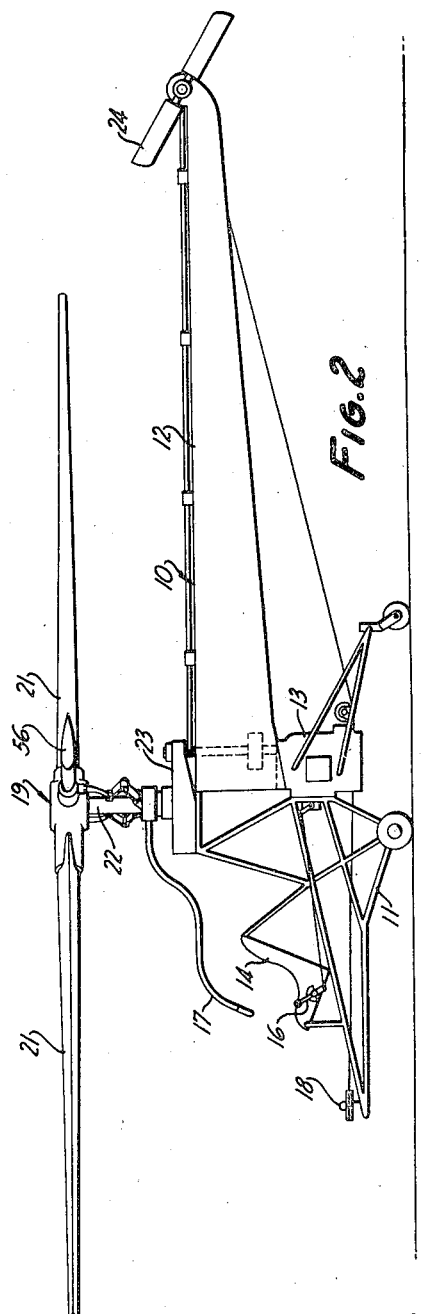
INVENTORS
STANLEY HILLER, JR.
JOSEPH STUART, III
BY
ATTORNEYS

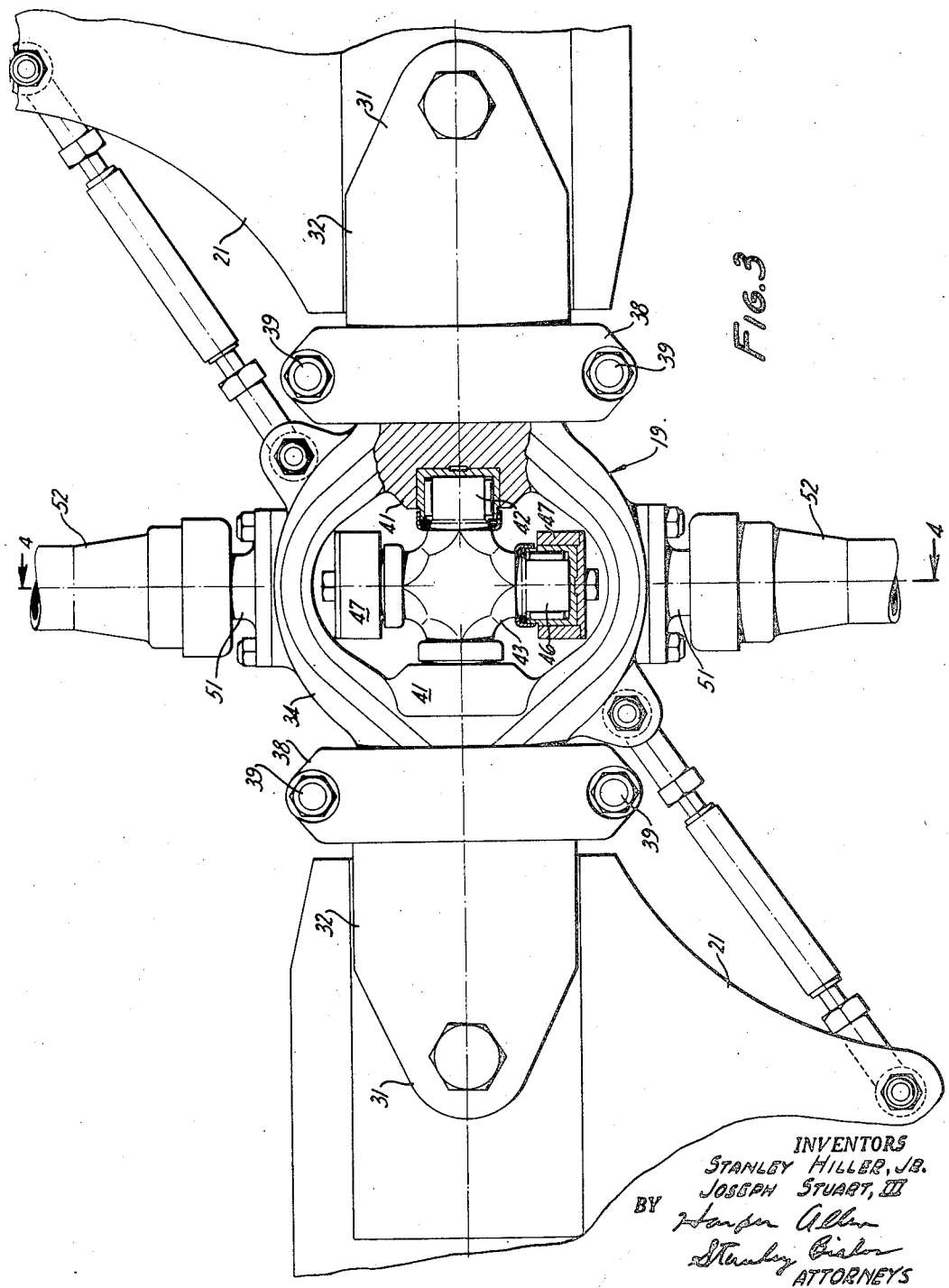

Sept. 13, 1949.　　　S. HILLER, JR., ET AL　　　2,481,750
HELICOPTER
Filed June 3, 1947　　　　　　　　　　　　　6 Sheets-Sheet 3
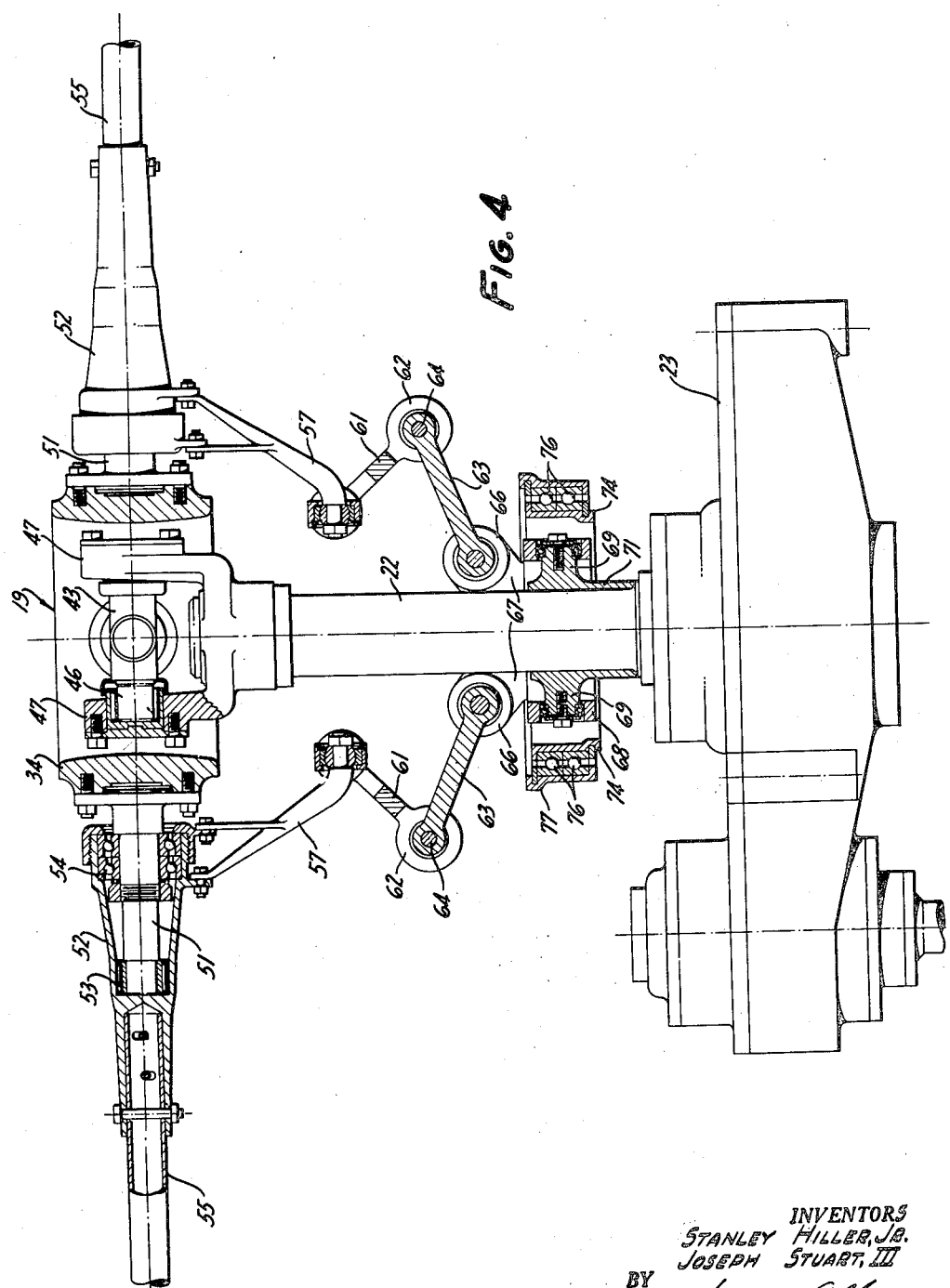
INVENTORS
STANLEY HILLER, JR.
JOSEPH STUART, III
BY
ATTORNEY Sept. 13, 1949.     S. HILLER, JR., ET AL     2,481,750
HELICOPTER Filed June 3, 1947     6 Sheets-Sheet 4

INVENTORS
STANLEY HILLER, JR.
JOSEPH STUART, III
BY
ATTORNEYS.

INVENTORS
STANLEY HILLER, JR.
JOSEPH STUART, III
BY
ATTORNEYS

Patented Sept. 13, 1949

2,481,750

UNITED STATES PATENT OFFICE 2,481,750

HELICOPTER

Stanley Hiller, Jr., Menlo Park, and Joseph Stuart, III, Palo Alto, Calif., assignors to United Helicopters, Inc., Palo Alto, Calif., a corporation of California Application June 3, 1947, Serial No. 752,146

12 Claims. (Cl. 170—135.26)

This invention relates to rotary wing aircraft such as helicopters and is concerned more particularly with an improved helicopter control applicable to helicopters of both the single lifting rotor and double contra-rotating lifting rotor types.

The single lifting rotor helicopter with a simple direct control has been notoriously difficult to fly and the stick control in general has been very tricky and delicate, especially in small helicopters. This is particularly true during hovering, and this type of helicopters has been known to overturn and to, in effect, fly itself into the ground before the pilot is fully aware of the difficulty.

We have discovered that the difficulty in this type of helicopter lies in the control response characteristics of such helicopters, and that the principal difficulties in flying such a helicopter occur from a controlled amplifying oscillation in roll of a relatively short period. These difficulties are overcome by providing a desirable low uniform sensitivity through use of a pilot-controlled servo-control rotor whose cyclic pitch is controlled by the pilot, and which in turn, controls the cyclic pitch of the lifting rotor or rotors. An auxiliary rotor has been proposed for use in correcting coning, for example, in the U. S. patent to Oehmichen, 1,800,470, dated April 14, 1931, and the corresponding British patents, 272,871, dated July 8, 1928, and 302,752, dated December 27, 1928. However, these patents too do not provide a servo-effect in the cyclic pitch control of the rotor.

The principal object of the present invention is to provide a helicopter which overcomes the above-noted difficulties and which is basically easy to fly.

A further object of the invention is to provide a helicopter which eliminates control stick heaviness, tendency to divergence and roughness of action.

Another object of the invention is to provide a helicopter embodying a servo system for controlling the lifting rotors.

A still further object of the invention is to provide a helicopter in which the stick control is transmitted to the main lifting rotor or rotors through a servo or control rotor system.

Still another object of the invention is to provide a helicopter in which control sensitivity is uniform, and is at a value that makes the helicopter easy to fly.

Other objects and advantages of the invention will be apparent from the following description of a preferred embodiment, as illustrated in the accompanying drawings, in which:

Figure 1 is a plan view of a single lifting rotor helicopter embodying the instant invention.

Figure 2 is a side elevational view of such a helicopter with certain of the body parts omitted.

Figure 3 is an enlarged fragmentary plan view of the rotor hub and its mounting.

Figure 4 is an elevational view, partially in section, of the drive head structure and the rotor mounting thereon, the view being taken as indicated by the line 4—4 in Figure 3.

Figure 5:
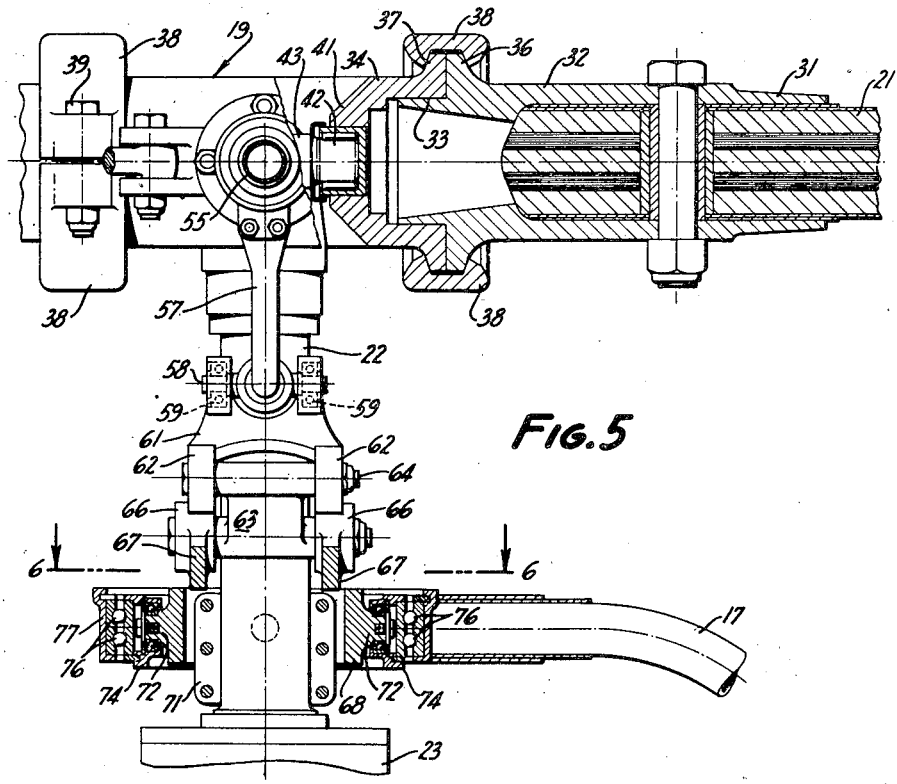
Figure 5 is an elevational view, partially in section, of the drive head structure which supports and drives the lifting rotor and the control mechanism associated therewith.

Referring to Figure 1, there is illustrated somewhat schematically a helicopter of the general type disclosed in the co-pending application of Stanley Hiller, Jr., Serial No. 523,181, filed February 21, 1944, for Helicopters, including a body or frame 10 formed of tubular struts having landing gear 11 thereon. Included in the body structure is a fuselage 12 suitably supported upon the framework 10. The helicopter includes also a power plant or internal combustion engine 13 located immediately rearwardly of an operator's compartment including a seat 14, a throttle control 16 for the engine, a directional control stick 17, referred to hereinafter, and a pair of foot pedals 18. Also, a drive head structure 19 is provided which carries the lift wing structure 21, as described hereinafter. The drive head structure also includes a wing supporting column in the form of a drive shaft 22 which is driven through a gear mechanism 23 and a suitable clutch from the engine 13. The helicopter is provided with a torque compensating tail rotor 24 driven through a shaft from the engine in a conventional manner.

The wing structure 21 of the helicopter is mounted for universal controlled movement about two axes at right angles to each with one of these axes containing the longitudinal axis of the wing structure.

Referring to Figures 3, 4 and 5, the two wing sections or blades of the lift wing or rotor structure are each clamped at their inner ends between bracket extensions 31 of a mounting post or stub shaft 32 which is seated in an annular recess 33 of the supporting hub 34. The mounting shaft 32 is provided with an annular flange 36 mating with a similar flange 37 of the supporting hub 34 to receive opposite clamping brackets 38 having securing and clamping bolts 39 associated therewith. The supporting hub 34 is provided with opposite bosses 41 apertured to receive opposite trunnions or bearing portions 42 of a cross-shaped universal support element 43 to support the wing for pitch adjustment about a longitudinal axis thereof.

The cross-shaped supporting element 43 (Figures 3 and 4) is also provided with opposite trunnions or bearing portions 46 which are journalled in opposite bosses 47 of a forked extension of the drive shaft 22. The trunnions 46 provide for end to end tilting or flapping of the wing structure about an axis transverse to its length.

In the embodiment shown the control rotor comprises similar opposite control blade structures 56 each including a support shaft 51 (Figures 1, 3 and 4) secured to the hub 34 on an axis at right angles to the longitudinal or pitch adjustment axis of the lifting rotor or wing structure. Supported on the shaft 51 for rotative adjustment movement thereabout is a support sleeve 52 journalled thereon by respective spaced bearings 53 and 54 and carrying at its outer end a tubular shaft extension 55 on which a blade structure 56 is mounted for pitch adjustment about the axis of the shaft 51.

Figure 6:
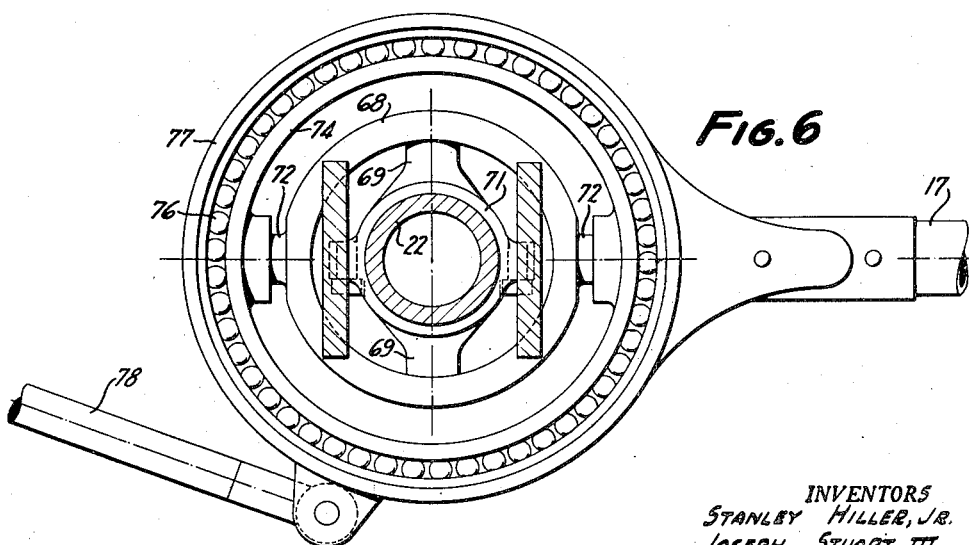
Figure 6 is a horizontal sectional view taken as indicated by the line 6—6 in Figure 5.

To control the rotative adjustment of the control rotor blade about its longitudinal axis there is secured to the support sleeve 52 (Figures 4 and 5) a depending pitch adjusting arm 57 having a universal ball and socket joint connection with a transverse support shaft 58 journalled in opposite bearings 59 at the upper end of a link 61. The link 61 is provided at its lower end with opposite bosses 62 to which a lower link section or arm 63 is pivotally mounted by a pin 64. The arm 63 is pivoted at its inner and lower end in a pair of opposite bearings mounted in spaced bosses 66 carried on an upstanding plate 67 on the inner gimbal ring 68 of the universally mounted wobble mechanism. The inner gimbal ring 68 is journalled on opposite trunnions 69 of a hub 71 secured on the drive shaft 22. The inner gimbal ring 68 is provided with another set of trunnions 72 journalled in the outer gimbal ring 74 of the wobble mechanism and the outer gimbal ring 74 is journalled by bearings 76 in the outer control ring 77 of the wobble mechanism. To prevent rotation of the outer control ring 77, a suitable link 78 is connected by suitable ball and socket joints between the ring 77 and a suitable stationary part of the helicopter structure. The control stick 17, as seen in Figures 5 and 6, is secured to the outer control ring 77.

From the above description it is seen that the control stick and the wobble mechanism are connected to effect cyclic pitch adjustment about the axis defined by shafting 51 of the two control blades of the universally mounted control rotor, and that through aerodynamic forces the control rotor itself thereby flaps or tilts about the axis defined by bearings 42 to assume a plane of rotation by virtue of such control blade pitch adjustment. Such flapping or tilting of the control blades automatically results in cyclic pitch adjustment of the lift wings 21 because the axis of bearings 42 about which the control blades can flap, is also the pitch adjustment axis for the lift wings, and the common universal mounting for both the lift wings and the control blades provides through hub 34 a positive actuating linkage connection between the control blades and the lift wings to permit such automatic pitch change of the lift wings upon flapping of the control blades. The cyclic pitch change of the lift wings in turn causes them to flap or tilt through aerodynamic forces on the lift wings about the axis defined by trunnions 46 to assume a predetermined plane of rotation for directional control as set or fixed by adjustment of the wobble mechanism. While various shapes and arrangements of the control rotor may be provided with respect to a given size, for a lifting rotor with an overall length of about twenty-four feet, satisfactory operation has been obtained with a planiform area or lift area of each control rotor blade of sixteen inches square with the area centers of the control rotor blades spaced six feet apart. In general, for safety considerations the control rotor should have a high stalling angle, and in practice on this helicopter a square planiform blade design has been found satisfactory.

With respect to the pitch adjustment control of the control blades, it will be noted that the pairs of links 61 and 63 provide a reversing scissors linkage from the wobble mechanism, to cause the pitch adjustment of the control blades and the utimate plane of rotation of the lift wings for directional control to correspond with the direction in which the control stick 17 is moved. As a result, for example, when the control stick is moved straight forward, the cyclic pitch adjustment will be such that the ship will move forward. For rearward motion, the pilot need only move the control stick rearwardly, etc. Without such reversing linkage, the pilot would have to move the control stick opposite to the direction in which he desired to travel.

In general the design and proportion of the control rotor and its associated control linkage, being independent of the lift characteristics required in a lifting rotor can be directed toward obtaining the desired sensitivity and control characteristics. In this connection it will be noted that the control rotor is of airfoil design and is provided with a low aspect ratio and a small radius so that the control rotor response speed is fixed at a relatively low value when compared with the lifting rotor of high aspect ratio and a substantially larger radius. In this way the rotor response can be made of sufficiently low sensitivity that the control rotor is at all times subject to the reactions of even a relatively inexperienced pilot. This is particularly important in small size craft. In general it is desirable to select the controlling values of the rotor system to provide a maximum rate of roll of the aircraft of about .5 radian per second to provide the desirable low sensitivity of the helicopter and this sensitivity remains uniform inasmuch as the control rotor is not adjusted to effect any lift of the aircraft. It will be noted also that there is no direct mechanical connection between the control stick and the lifting blades so that the stick is not subjected to the rough action of the lifting rotor and is relatively easy and smooth in adjustment.

In connection with the use of a control rotor system it is desired to point out that the amount of quarter-chord balancing of the lifting rotor can be reduced to the minimum necessary to eliminate flutter.

Figure 7:
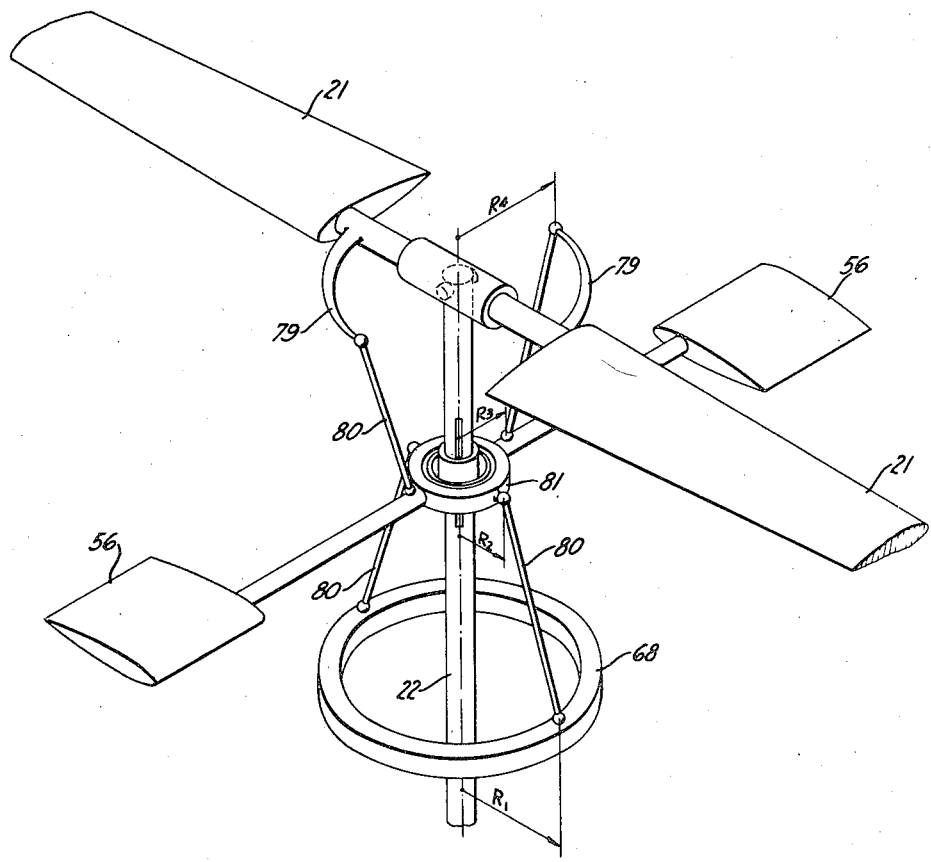
Figure 7 is a schematic perspective view of a modified construction of a single lifting rotor helicopter in which the control rotor is axially spaced from the lifting rotor.

Referring to Figure 7, there is illustrated schematically a helicopter rotor system of the single rotor two-blade type employing a servo or control rotor 56 which is mounted for universal movement by a gimbal mechanism 81 about the drive shaft 22 in the usual fashion but in axially displaced relation to the universal mounting of the lifting rotor 21. It will be noted that the control rotor 56 is controlled by a wobble mechanism 68, which may be of any desired type, through suitable control links 80. The control rotor 56 in turn is connected to control the pitch of the blades of the lifting rotor 21 through suitable links 80 and respective pitch adjusting arms 79 which extend through 90° from the blades 21 for connection to the associated links 80. Also, the servo or control rotor is slidable axially along the shaft to impart collective pitch adjustment to the lifting rotor for ascent and descent of the aircraft, and for this reason the modification of Figure 7 may be preferred, whereas in the Figure 1 modification this movement was controlled by the amount of throttle.

It will be noted in Figure 7 that the input ratio $R_1/R_2$ is greater than one, while the output ratio $R_3/R_4$ is less than one, as pointed out in connection with the following description. The input ratio is defined as the fraction of the wobble mechanism tilt used for control rotor cyclic pitch. Since the radius $R_1$ in the Fig. 7 modification is greater than the radius $R_2$, a mechanical advantage obtains so that for any given angle of tilt to which the wobble mechanism may be adjusted from a given position by the control stick, the angle of pitch adjustment of the control blade will be multiplied. The output ratio is defined as the fraction of the control rotor flapping used for the lifting rotor cyclic pitch. Inasmuch as this ratio is preferably less than 1 in the Fig. 7 modification, the pitch of the lifting rotor will be adjusted to a lesser angle than the angle of flapping of the control rotor.

In general it is desirable that the input ratio from the stick or wobble mechanism to effect adjustment of the control rotor be greater than one to provide a large range of control rotor blade cycling amplitude and thereby permit the pilot to combat local forward flight air flow deviations at the control rotor with minimum changes from neutral at the control stick. In general the output ratio from the servo or control rotor to the lifting rotor can be less than one to increase the effectiveness of the control rotor and thus permit the use of a minimum size of control rotor. Also, when desired, a proper selected amount of delta-three may be employed between the main rotor and the control rotor to eliminate lateral stick in forward flight. It may be also used in either control system portion for flapping frequency adjustment.

From the preceding descriptions of both the modifications of Figures 1 and 7 it is to be noted that since the servo control rotor embodies blades, such blades have a reactive effect in the air as they are subjected to cyclic pitch control by the wobble mechanism. They themselves provide a force resulting from such reactive effect which in turn provides the servo effect to give the desired cyclic pitch control of the main rotor wings through the linkage connection between the servo rotor and the main rotor wings.

In this connection, it should be kept in mind, as previously stated, that the servo control blades are relatively small and do not have any material lift characteristics in so far as support of the aircraft and do not necessarily contribute to lift of the aircraft. Also, there is an inherent slower rate of response of the control to the adjustment imparted thereto by the control stick as compared to direct adjustment of the blades of the main rotor from a control stick. This slower rate of response coupled with ease of adjustment of the servo control blades makes for safety in operation compared to heretofore employed arrangements where the main rotor wings are directly controlled.

This is so because in the latter, the response to adjustment is so rapid, relatively speaking, that it is difficult for a pilot, unless extremely experienced, to note the effect of his adjustment in order to avoid over-adjustment. As a result, he virtually has to fight the control stick. With the mechanism of this invention, since it provides a low uniform sensitivity, the pilot has ample time to make proper adjustments without over-shooting and with very little effort on his part.

Figure 8:
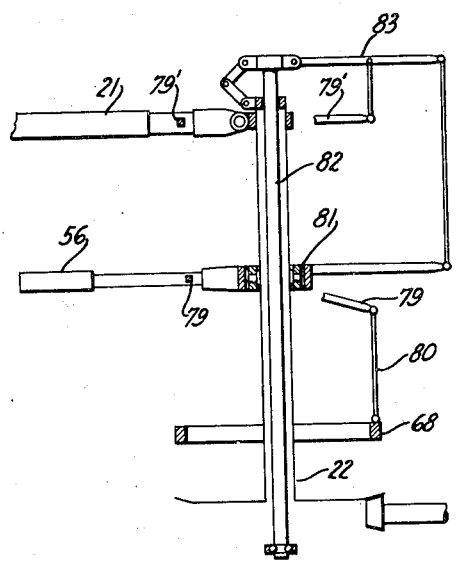
Figure 8 is a schematic sectional view illustrating a further modified construction of a single lifting rotor helicopter providing for any desired number of blades in both the lifting rotor and the control rotor.

Figure 8 shows a single lifting rotor system for a helicopter having one or more hinged blades per lifting rotor and a servo rotor 56 associated therewith having one or more blades in which the collective pitch adjustment is introduced into the lifting rotor independently of the servo or control rotor by means of the shaft 82 and the adding link 83 connected thereto and to the control rotor. The stick control is imparted to the system through a conventional form of wobble mechanism 68 of any suitable construction which is connected by respective links 80 to the pitch adjusting arms 79 of the respective control rotor blades 56. The cyclic pitch control of the main rotor blades 21 is in turn imparted to them from the plane of rotation established by the servo control rotor 56 through a suitable linkage including the adding link previously referred to, to which is connected the pitch adjusting arms 79' of the main rotor blades which are similar in construction and mounting to those shown in Figure 7. This system is suitable for single lifting rotors having more than two blades. In these cases three or more blades are used in the control rotor to define a plane rather than a line for cyclic pitch control of the lifting rotor blades. It will be noted that the modification shown in Figure 8 differs from those previously described in that the Figures 1 and 7 modifications provide for two lifting blades only in the lifting rotor.

Figure 9:
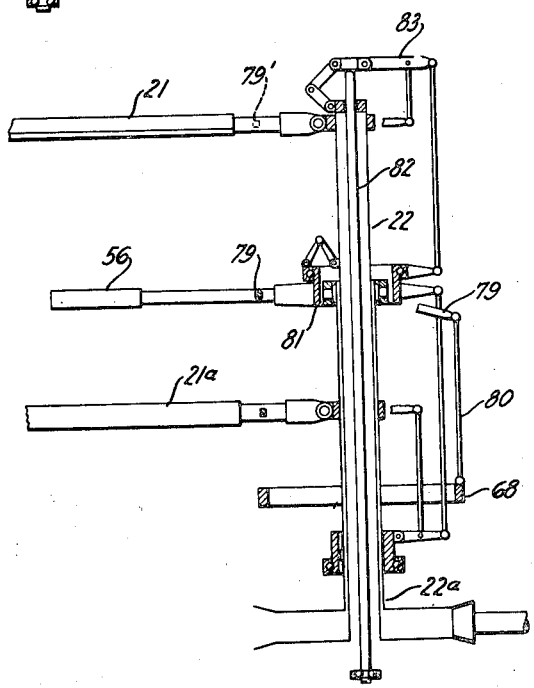
Figure 9 is a schematic sectional view of a helicopter rotor system of the type having coaxial contra-rotating lifting rotors.

Figure 9 illustrates schematically the servo control rotor system as applied to the coaxial contrarotating rotor or wing structure wherein the control rotor 56 is interposed between the two lifting rotors 21 and 21a and with this type of system the lifting rotor may have two or more blades per rotor. It will be noted that the control system in Figure 9 in so far as the wobble mechanism and the connecting linkages and pitch adjusting arms are similar to those previously described in that the wobble mechanism control is imparted to the control rotor and the control of the lifting rotors is obtained from the control rotor in conjunction with the collective pitch adjustment of the oppositely rotating blades of the lifting rotors. Irrespective of the number of blades employed in the lifting rotor of this type, it will be noted that the control rotor should have three or more blades to define a complete plane of rotation for reference in effecting cyclic pitch control of the lifting blades.

While the preceding disclosure has been directed primarily to the use of the invention disclosed herein in small size helicopters, it will be appreciated that the invention will also be useful in conjunction with large helicopters or other rotary wing aircraft where the servo effect can be usefully employed in controlling the pitch adjustment of the lifting rotor and in such large helicopters the design of the control rotor may be more conventional. For example, the control rotor may become considerably larger than the paddle design rotor shown in the drawings and may approximate the size of the lifting rotors. It may also have an aspect ratio substantially greater than one.

While we have shown certain preferred embodiments of the invention it will be seen that the invention is capable of variation and modification from the form shown so that its scope should be limited only by the scope of the claims appended hereto.

We claim:

1. In a helicopter, a drive structure, a lifting rotor having a hub mounted for universal tilting movement with respect to the drive structure and driven thereby, a control rotor comprising a pair of opposite control blades mounted in axial alignment on said hub for rotative adjustment about an axis at right angles to the longitudinal axis of the lifting rotor, and means including a control stick and a wobble mechanism for effecting pitch adjustment of the control rotor.

2. In a helicopter, a drive structure, a lifting rotor having a hub mounted for universal tilting movement with respect to the drive structure and connected to be driven thereby, a control rotor having blades mounted on said hub for pitch adjustment, a controlling connection from the control rotor to the lifting rotor, and means including a control stick and a wobble mechanism for effecting pitch adjustment of the control rotor blades.

3. In a helicopter of the coaxial contra-rotating rotor type, a drive structure, a pair of lifting rotors mounted on said drive structure, means for driving said rotors in opposite directions, each of said rotors being individually adjustable as to pitch, and a servo control rotor mounted on said drive structure for rotation with one of said lifting rotors and connected to the rotors for effecting cyclic pitch adjustment thereof.

4. In a helicopter of the contra-rotating coaxial type, a drive structure, a pair of coaxial contra-rotating lifting rotors having blades mounted for pitch adjustment, a control rotor comprising at least three blades mounted for cyclic pitch adjustment and driven with one of said coaxial rotors, pilot controlled means for effecting cyclic pitch adjustment of said control rotor, and control means from said control rotor to each of said lifting rotors.

5. In a rotary wing aircraft; a lift wing supporting column; a lift wing; a control blade for said lift wing; means mounting said lift wing and said control blade for rotation about the axis of said column; said mounting means including a pivotal mounting for said lift wing along a first axis extending longitudinally of the lift wing for pitch adjustment thereof, a pivotal mounting for said lift wing along a second axis extending transversely of said first axis for flapping of the lift wing, a pivotal mounting for the control blade extending longitudinally of the control blade for pitch adjustment thereof along a third axis, and a pivotal mounting for the control blade along an axis extending transversely of said third axis for flapping of the control blade whereby said pitch adjustment of the control blade automatically results through aerodynamic forces upon said control blade in said flapping of the control blade; a positive actuating connection between said control blade and said lift wing to effect said pitch adjustment of said lift wing about said first axis upon flapping of said control blade which automatically results through aerodynamic forces upon the lift wing in flapping of said lift wing about said second axis; and means including a pilot operable control member for effecting pitch adjustment of the control blade.

6. In a rotary wing aircraft; a lift wing supporting column; a lift wing; a control blade for said lift wing; means mounting said lift wing and said control blade for rotation about the axis of said column; said mounting means including a pivotal mounting for said lift wing along a first axis extending longitudinally of the lift wing for pitch adjustment thereof, a pivotal mounting for said lift wing along a second axis extending transversely of said first axis for flapping of the lift wing, a pivotal mounting for the control blade extending longitudinally of the control blade for pitch adjustment thereof along a third axis, and a pivotal mounting for the control blade along an axis extending transversely of said third axis for flapping of the control blade whereby said pitch adjustment of the control blade automatically results through aerodynamic forces upon said control blade in said flapping of the control blade; a positive actuating connection between said control blade and said lift wing to effect said pitch adjustment of said lift wing about said first axis upon flapping of said control blade which automatically results through aerodynamic forces upon the lift wing in flapping of said lift wing about said second axis; wobble mechanism for setting the pitch adjustment of said control blade; a linkage connection between said wobble mechanism and said control blade for transmitting to said control blade the pitch adjustment set by said wobble mechanism; and a pilot operable control member for adjusting said wobble mechanism.

7. In a rotary wing aircraft; a lift wing supporting column; a lift wing; a control blade for said lift wing; means mounting said lift wing and said control blade for rotation about the axis of said column; said mounting means including a pivotal mounting for said lift wing along a first axis extending longitudinally of the lift wing for pitch adjustment thereof, a pivotal mounting for said lift wing along a second axis extending transversely of said first axis for flapping of the lift wing, a pivotal mounting for the control blade extending longitudinally of the control blade for pitch adjustment thereof along a third axis, and a pivotal mounting for the control blade along an axis extending transversely of said third axis for flapping of the control blade whereby said pitch adjustment of the control blade automatically results through aerodynamic forces upon said control blade in said flapping of the control blade; said control blade flapping axis being coincident with said first axis; a positive actuating connection between said control blade and said lift wing to effect said pitch adjustment of said lift wing about said first axis upon flapping of said control blade which automatically results through aerodynamic forces upon the lift wing in flapping of said lift wing about said second axis; and means including a pilot operable control member for effecting pitch adjustment of said control blade.

8. In a rotary wing aircraft; a lift wing supporting column; a lift wing; a control blade for said lift wing; means mounting said lift wing and said control blade for rotation about the axis of said column; said mounting means including a pivotal mounting for said lift wing along a first axis extending longitudinally of the lift wing for pitch adjustment thereof, a pivotal mounting for said lift wing along a second axis extending transversely of said first axis for flapping of the lift wing, a pivotal mounting for the control blade extending longitudinally of the control blade for pitch adjustment thereof along a third axis, and a pivotal mounting for the control blade along an axis extending transversely of said third axis for flapping of the control blade whereby said pitch adjustment of the control blade automatically results through aerodynamic forces upon said control blade in said flapping of the control blade; a positive actuating connection between said control blade and said lift wing to effect said pitch adjustment of said lift wing about said first axis upon flapping of said control blade which automatically results through aerodynamic forces upon the lift wing in flapping of said lift wing about said second axis; means including a pilot operable control member for effecting pitch adjustment of the control blade; and means independent of the pitch adjustment of the lift wing effected through said flapping of the control blade for imparting collective pitch adjustment to said lift wing.

9. In a rotary wing aircraft, a lift wing supporting column, a lift wing, a structure for mounting said lift wing on said column for rotation about the axis of said column and for pitch adjustment about a first axis extending longitudinally of the lift wing and for flapping of the lift wing about a second axis extending transversely with respect to said first axis, a control blade journalled on said lift wing mounting structure for pitch adjustment about a third axis extending longitudinally of the control blade and transversely with respect to said first axis whereby said control blade can flap about said first axis and automatically effect pitch adjustment of said lift wing, wobble mechanism for setting the pitch adjustment of said control blade, a pair of pivotally connected links between said wobble mechanism and said control blade providing a reversing linkage for transmitting to said control blade the pitch adjustment set by said wobble mechanism, and a pilot operable control member for adjusting said wobble mechanism.

10. In a rotary wing aircraft, a lift wing supporting column, a pair of diametrically opposite lift wings, a hub structure for said wings rotatable about the axis of said column and upon which said wings are mounted, means mounting said hub structure on said column for pivotal movement about a first axis extending longitudinally of said wings for simultaneous pitch adjustment of the lift wings and for pivotal movement about a second axis extending transversely with respect to said first axis whereby said lift wings can flap about said second axis, a pair of diametrically opposite control blades journalled on said hub structure for pitch adjustment about a third axis extending longitudinally of the control blades and transversely with respect to said first axis whereby upon pitch adjustment of said control blades they can flap about said first axis to effect pitch adjustment of said lift wings, anad means including a pilot operable control member for effecting pitch adjustment of the control blades.

11. In a rotary wing aircraft, a lift wing supporting column, a pair of diametrically opposite lift wings, a hub structure for said wings rotatable about the axis of said column and upon which said wings are mounted, means mounting said structure on said column for pivotal movement about a first axis extending longitudinally of said wings for simultaneous pitch adjustment of the lift wings and for pivotal movement about a second axis extending at a right angle with respect to said first axis whereby said lift wings can flap about said second axis, a pair of diametrically opposite control blades journalled on said hub structure for pitch adjustment about a third axis extending longitudinally of the control blades and at a right angle with respect to said first axis whereby upon pitch adjustment of said control blades they can flap about said first axis to effect pitch adjustment of said lift wings, wobble mechanism for setting the pitch adjustment of said control blades, a linkage connection between said wobble mechanism and said control blades for transmitting to said control blades the pitch adjustment set by said wobble mechanism, and a pilot operable control member for adjusting said wobble mechanism.

12. In a rotary wing aircraft, a lift wing supporting column, a pair of diametrically opposite lift wings, a hub structure for said wings rotatable about the axis of said column and upon which said wings are mounted, means mounting said hub structure on said column for pivotal movement about a first axis extending longitudinally of said wings for simultaneous pitch adjustment of the lift wings and for pivotal movement about a second axis extending at a right angle with respect to said first axis whereby said lift wings can flap about said second axis, a pair of diametrically opposite control blades journalled on said hub structure for pitch adjustment about a third axis extending longitudinally of the control blades and at a right angle with respect to said first axis whereby upon pitch adjustment of said control blades they can flap about said first axis to effect pitch adjustment of said lift wings, wobble mechanism for setting the pitch adjustment of said control blades, a pair of pivotally connected links between said wobble mechanism and each control blade providing a reversing linkage for transmitting to such control blade the pitch adjustment set by said wobble mechanism, and a pilot operable control member for adjusting said wobble mechanism.

STANLEY HILLER, Jr.
JOSEPH STUART, III.

REFERENCES CITED

The following references are of record in the file of this patent:

UNITED STATES PATENTS

| Number | Name | Date |
| --- | --- | --- |
| 1,800,470 | Oehmichen | Apr. 14, 1931 |
| 2,041,787 | Stalker | May 26, 1936 |
| 2,041,789 | Stalker | May 26, 1936 |